(12) United States Patent
Greene

(10) Patent No.: US 6,893,565 B2
(45) Date of Patent: May 17, 2005

(54) SYSTEM AND PROCESS FOR TREATING CARBONACEOUS WASTES

(75) Inventor: Annel K. Greene, Clemson, SC (US)

(73) Assignee: Clemson University, Clemson, SC (US)

( * ) Notice: Subject to any disclaimer, the term of this patent is extended or adjusted under 35 U.S.C. 154(b) by 26 days.

(21) Appl. No.: 10/325,669

(22) Filed: Dec. 20, 2002

(65) Prior Publication Data

US 2003/0146140 A1 Aug. 7, 2003

Related U.S. Application Data

(63) Continuation-in-part of application No. 09/660,266, filed on Sep. 12, 2000, now Pat. No. 6,500,333, which is a continuation-in-part of application No. 09/320,904, filed on May 27, 1999, now Pat. No. 6,117,324.

(51) Int. Cl.[7] .............................. C02F 1/78; C02F 3/32
(52) U.S. Cl. ...................... 210/602; 210/631; 210/758; 210/760; 210/916
(58) Field of Search ................................ 210/602, 627, 210/631, 758, 760, 192, 916

(56) References Cited

U.S. PATENT DOCUMENTS

| | | |
|---|---|---|
| RE22,444 E | 2/1944 | Shook |
| 3,459,303 A | 8/1969 | Bradley |
| 3,485,750 A | 12/1969 | Albertson |
| 3,577,341 A | 5/1971 | Keith et al. |
| 3,591,491 A | 7/1971 | Smith et al. |
| 3,607,737 A | 9/1971 | Garner |
| 3,617,537 A | 11/1971 | Vermette |
| 3,638,793 A | 2/1972 | Peck |
| 3,660,277 A | 5/1972 | McWhirter et al. |
| 3,709,364 A | 1/1973 | Salvage |
| 3,806,448 A | 4/1974 | Smith et al. |
| 3,825,494 A | 7/1974 | Call et al. |
| 3,846,292 A | 11/1974 | Lecompte, Jr. |
| 3,918,404 A | 11/1975 | Bunger |
| 3,982,499 A | 9/1976 | Frankl |
| 4,132,637 A | 1/1979 | Key et al. |
| 4,178,239 A | 12/1979 | Lowther |
| 4,214,887 A | 7/1980 | Gelder |
| 4,256,574 A | 3/1981 | Bhargava |
| 5,078,965 A | 1/1992 | Pearson |
| 5,520,888 A | 5/1996 | Berndt |
| 5,897,785 A | 4/1999 | Billings |
| 2003/0159987 A1 * | 8/2003 | Jensen ........................ 210/602 |

FOREIGN PATENT DOCUMENTS

JP          09174071 A    *   7/1997

OTHER PUBLICATIONS

Finch, et al., Recovery of a Marker Strain of *Escherichia coli* from Ozonated Water by Membrane Filtration, pp 2894–2896, Dec. 1987, Applied and Environmental Microbiology.

(Continued)

*Primary Examiner*—Robert A. Hopkins
(74) *Attorney, Agent, or Firm*—Dority & Manning, P.A.

(57) ABSTRACT

The present invention is generally directed to a process and system for treating animal waste. More particularly, the present invention is directed to a process and system for treating animal waste effluent with ozone to decompose the organic material within and improve the odor of the animal waste. The process of the present invention also reduces biochemical oxygen demand, chemical oxygen demand, total bacterial content and coliform bacterial count of the animal waste. The process of this present invention comprises collecting an animal waste solution, containing a mixture of water and animal fecal material; contacting the waste solution with ozone in an amount sufficient to oxidize at least a portion of the organic material contained within; and feeding the ozone treated waste solution to a solids separating device prior to collecting the waste solution in a biobasin or, alternatively, recycling the ozone treated waste solution for use as a source of irrigation or flushwater.

42 Claims, 6 Drawing Sheets

OTHER PUBLICATIONS

Restaino, et al., Efficacy of Ozonate Water against Various Food–Related Microorganisms, pp. 3471–3756, Sep. 1995, Applied and Environmental Microbiology.

Y. H. Chang and B. W. Sheldon, Application of Ozone with Physical Wastewater Treatments to Recondition Poultry Process Waters, pp. 1078–1087, Jun. 6, 1988, Journal Series of the North Carolina Agriculture Research Series, Raleigh, NC 27695–7601.

Finch, et al., Comparison of *Giardia lamblia* and *Giardia muris* Cyst Inactivation by Ozone, pp. 3674–3680, Nov. 1993, Applied and Environmental Microbiology.

Finch, et al., Ozone Inactivation of *Cryptosoridium parvum* in Demand–Free Phosphate Buffer Determined by In Vitro Excystation and Animal Infectivity, pp. 4203–4210, Dec. 1993, Applied and Environmental Microbiology.

B.A. Meiners, R.E. Peters and J.B. Mudd, Effects of Ozone on Indole Compounds and Rat Lung Monoamine Oxidase, p. 99–112, 1997, Environmental Research.

Duane L. Peavy and Edward J. Fairchild II, Toxicologic Interactions between Oxone and Bacterial Exdotoxin, p. 63–71, 1987, Environmental Research.

I.Arana, P.Santorum, A.Muela and I.Barcina, Chlorination and ozonation of waste–water:comparative analysis of efficacy through the effect on *Esherichia coli* membranes, p. 883–888, 1999, Journal of Applied Microbiology.

E. Smet & H. Van Langenhove, Abatement of volatile organic sulfur compounds in odorous emissions from bio-–industry, Biodegration 9:273–284, 1998.

William A. Feder, Bioassaying for Ozone With Pollen Systems, vol. 37:117–123, Jan. 1981, Environmental Health Prospectives.

Serge Chiron, Antonio Rodriguez and Amadeo Fernandez–Alba, Application of gas and liquid chromatography—mass spectrometry to the evaluation of pirimiphos methyl degradation products in industrial water under ozone treatment, Journal of Chromatography A, 823:97–107, 1998.

I.R. Komanapalli and B.H.S. Lau, Inactivation of bacteriophage λ, *Escherichia coli,* and *Candida albicans* by ozone, Appl Microbiol Biotech, 49:766–769, 1998.

Muela, et al., Discharge of disinfected wastewater in recipient aquatic systems: fate of allochthonous bacterial and autochthonous protozoa populations, Journal of Applied Microbiology, 85:263–270, 1998.

Byun, et al., Gamma Irradiation and Ozone Treatment for Inactivation of *Escherichia coli* 0157:H7 in Culture Media, Journal of Food Protection, 61:728–730, 1998.

McKenzie, et al., Aflatoxicosis in Turkey Poults is Prevented by Treatment of Naturally contaminated Corn with ozone Generated by Electrolysis, Environment and Health, 1094–1102, 1998.

Klare, et al., Degradation of Nitrogen Containing Organic Compounds by Combined Photocatalysis and Ozonation, Chemosphere, 38:2013–2027, 1999.

Yu, et al., Pretreatment and Biodegradability Enhancement of DSD Acid Manufacturing Wastewater, Chemosphere, 37:487–494, 1998.

Watkins, et al., Ozonation of Swine Manure Wastes to Control Odors and Reduce the Concentrations of Pathogens and Toxic Fermentation Metabolites, Ozone Science & Engineering, 19:425–437, 1997.

* cited by examiner

SYSTEM AND PROCESS FOR TREATING CARBONACEOUS WASTES

RELATED APPLICATIONS

The present application is a continuation-in-part application of U.S. Ser. No. 09/660,266 filed on Sep. 12, 2000 now U.S. Pat. No. 6,500,333, which is a continuation-in-part application of U.S. Ser. No. 09/320,904 filed on May 27, 1999, which issued as U.S. Pat. No. 6,117,324.

BACKGROUND OF THE INVENTION

One major dilemma plaguing farmers who raise livestock and/or poultry is the ability to efficiently neutralize and dispose of animal waste. Left untreated, animal waste is a significant health and environmental hazard. Animal waste creates a public nuisance because of its odor, and improper disposal is associated with significant problems such as water contamination.

In the past, animal waste was typically collected and channeled to a pond or lagoon. Before being emptied into the lagoon, the animal waste may or may not have been separated via mechanical means in order to remove various particulate matter such as sediment. Once fed to the pond or lagoon, the animal waste came in contact with various microorganisms and underwent biodegradation.

Prior art systems, however, have various deficiencies and drawbacks. In particular, these systems did little to initially improve the odor of the waste. Typically, odors originating from the animal waste were improved or reduced only after a substantial amount of time.

Further, these systems tended to work very slowly and would completely fail under some environmental conditions. For instance, under stagnant and hot conditions, the pond or lagoon would fail to adequately biodegrade the waste, overloading the system and creating a very unfavorable situation. Continued deposit of waste into the overloaded system would result in reduced growth or death of the microorganisms responsible for biodegradation.

As such, a need currently exists for an improved system and process for treating animal waste. In particular, a need currently exists for a process that can safely treat animal waste very rapidly to immediately reduce or otherwise improve the odor that emanates from the waste. A need also exists for a system and process that can very quickly reduce BOD, COD, total bacterial count, and the total coliform count present in animal waste.

SUMMARY OF THE INVENTION

In one embodiment, the present invention is directed to a system and process for treating animal waste. The process includes the steps of collecting an animal waste composition containing a mixture of water and animal fecal matter and contacting the animal waste composition with ozone in an amount sufficient to oxidize organic matter contained in the animal waste solution. Specifically, the process for treating animal waste is capable of improving the odor associated with the animal waste. The process of the present invention also reduces BOD, COD, total bacterial content and the coliform content associated with the animal waste. By partially oxidizing the organic matter in route to a lagoon or other biological treatment, the process of the present invention makes the organic matter more readily biodegradable and utilizable by the microflora in the lagoon.

Besides animal wastes, however, it should be understood that the process of the present invention generally can treat any organic or mixture of organic and inorganic carbonaceous waste. In one embodiment, waste is treated and the byproducts of the process are fed to a plant system for irrigating and/or fertilizing plants. In this embodiment, the process of the present invention includes the steps of collecting a waste composition and contacting the composition with a gas comprising ozone. The ozone is present in an amount sufficient to oxidize organic matter contained in the composition. Thereafter, the composition is fed to a plant system.

In general, the ozone that is contacted with the organic solution can be at a concentration of at least 0.01 ppm, such as from about 0.3 ppm to saturation. Whether in a batch process, a semi-continuous process, or in a continuous process, the ozone can contact the organic solution for a time sufficient for the organic matter to be oxidized. In one embodiment, the ozone is contacted with the solution in a venturi.

The plant system that is treated in accordance with the process of the present invention can vary depending upon the particular application. For instance, the plant system can be a wetland, a hydroponic system, an ornamental tree farm, timber fields, a greenhouse flat contained in a greenhouse, woody ornamentals, plants contained in a field, plants contained on a drifting water surface, and the like. The plants can be annual plants or perennial plants or woody plants.

Other features and aspects of the present invention are discussed in greater detail below.

BRIEF DESCRIPTION OF THE FIGURES

A full and enabling disclosure of the present invention, includes reference to the accompanying figures, in which.

Figure 1:
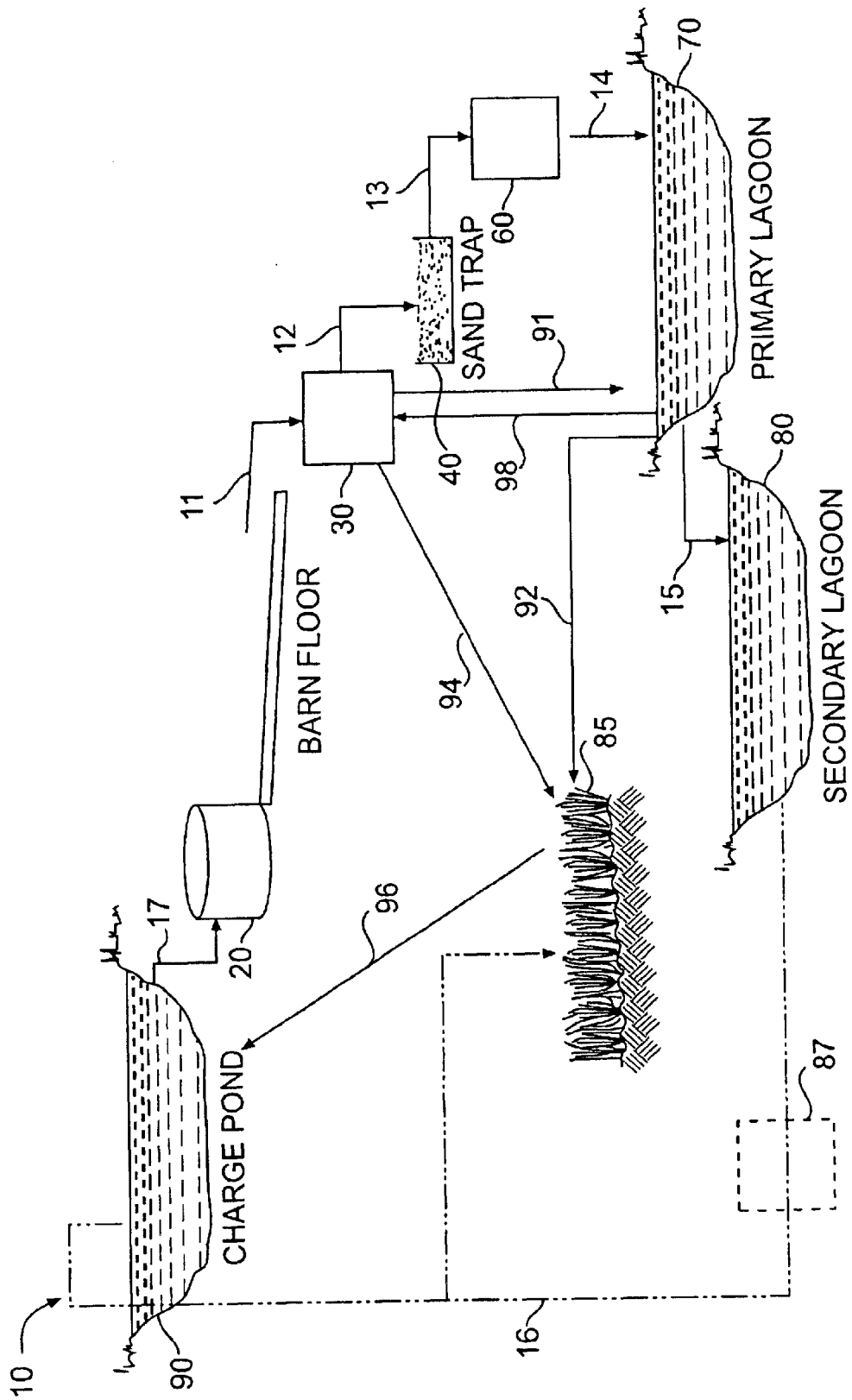
FIG. 1 is a diagrammatical view of an animal waste system made in accordance with the present invention.

Repeat use of reference characters in the present specification and drawings is intended to represent same or analogous features of the invention.

DETAILED DESCRIPTION OF PREFERRED EMBODIMENT

Other features and aspects of the present invention are disclosed in, or are obvious from, the following Detailed Description. It is to be understood by one of ordinary skill in the art that the present discussion is a description of exemplary embodiments only and is not intended as limiting the broader aspects of the present inventions.

In general, the present invention is broadly directed to a process for treating waste such as animal waste, and other malodorous wastewater. In particular, the system and process of the present invention are directed toward treating waste with ozone in an amount sufficient to oxidize organic matter contained in the waste, so that the odor accompanying the waste is substantially reduced. Additionally, treatment of organic waste according to the present invention results in a significant reduction in the biochemical oxygen demand (BOD), chemical oxygen demand (COD), total bacteria count, and coliform bacteria count.

One presently preferred embodiment of the present invention directed to the treatment of animal waste is broadly illustrated in FIG. 1. System 10 generally comprises a barn or other animal containment area, flush tank 20, treatment chamber 30, settling device 40, solids separator 60, a first biobasin 70, a second biobasin 80, a plant system 85, and charge pond 90. System 10 may further include conduit 11, connecting flush tank 20 to treatment chamber 30; conduit 12, connecting treatment chamber 30 to settling device 40; conduit 13, connecting settling device 40 to solids separator 60; conduit 14, connecting solids separator 60 to first biobasin 70; conduit 15, connecting first biobasin 70 to second biobasin 80; and discharge line 16, connecting second biobasin 80 to charge pond 90 and/or plant system 85.

Animal facilities often use contained areas to house animals for at least a portion of the animal's growth cycle. For example, farming operations, poultry houses and livestock production facilities may segregate some, if not all, of the animals in a barn or other enclosed structure. Likewise, commercial facilities such as dog kennels may breed and house animals in an enclosed structure. Enclosed structures present a problem to the animal caretaker, however, in that excrement and other waste products such as spilled feed, must be discarded. One disposal solution is to flush the floor of the containment area with running water so as to produce an animal waste composition. The animal waste composition subsequently is flushed via a drain into a holding area. Alternately, animal waste may be collected manually and disposed of in a holding area. The animal waste composition in the holding area can be subjected to further treatment, if desired.

Referring now to FIG. 1, a system for animal waste treatment is illustrated which will be described first followed by a discussion of the process for treating the waste. According to the present invention, flush tank 20 can be configured as a tank, a drum, a chamber, a cylinder, an earthen vessel, a fluid hose, a fluid pipe, or in any other shape sufficient to contain fluid within for flushing animal waste from the floor of a barn or other animal containment facility. The tank can be made of various material in accordance with the invention, such as steel, concrete, aluminum, or any other material suitable for holding fluid. The size of the tank can range from about 1 gallon to about 1,000,000 gallons depending on the size of the operation to be flushed.

In one embodiment contemplated by the present invention, flush tank 20 is associated with an ozonator to provide a source of ozone for treating contaminated water. The ozonator will be described in more detail below.

In a preferred embodiment, flush tank 20 further comprises a mechanism for rapidly releasing flush water. According to the present invention, the mechanism may include a pump sufficient to pump water from tank 20 through conduit 11 to waste treatment chamber 30. Alternately, flush water may be discharged gravitationally from flush tank 20.

In accordance with the present invention, conduit 11, connecting flush tank 20 to treatment chamber 30, may comprise a floor, a pipe, a tube, a channel or any other device suitable for safely transporting a fluid solution from a source to a receptacle. Fluid may be driven through conduit 11 as a result of force generated by a pump or, alternatively, the fluid may be conducted through conduit 11 by gravity. Fluid flowing through conduit 11 flushes animal waste from the animal holding area to treatment chamber 30.

According to the present invention, an animal waste composition is deposited into treatment chamber 30. As described above, the waste composition comprises waste flushed from the floor of an animal containment facility by flush water from flush tank 20 and travels via conduit 11 into treatment chamber 30. The composition can be a solution, a suspension, an emulsion, a slurry, or any other mixture of organic matter and a liquid. In an alternative embodiment, animal waste may be collected from the animal containment area and manually deposited into treatment chamber 30, to be mixed with water.

Treatment chamber 30 is configured as described above for flush tank 20. For example, treatment chamber 30 can be any suitable tank, an earthen vessel, and like. Depending upon the amount of animal waste to be treated, treatment chamber 30 ranges in size from about 1 gallon to about 1,000,000 gallons.

In accordance with the present invention, treatment chamber 30 preferably is associated with an ozonator to provide a source of ozone for waste treatment. In general, an ozonator produces ozone by, for example, applying electricity or a charge or ultraviolet light to air or oxygen resulting in ozone-enriched air. One embodiment of the present invention contemplates an ozonator comprising an ozone generator, but any device which creates ozone from air or oxygen and permits the ozone produced to contact the animal waste composition, such that the ozone reacts with animal waste constituents, is contemplated by the present invention.

As described above, the ozonator of the present invention can include a source of electricity to produce ozone from air or oxygen. Preferably, the electricity source for the ozonator comprises a photoelectric array, however, other sources of electricity useful for producing ozone from air or oxygen are contemplated by the present invention.

In one embodiment, the ozonator includes multiple ports located at or near the bottom of treatment chamber 30, to permit the ozone generated by the ozonator to enter the bottom of chamber 30 to contact the animal waste composition therein. In one embodiment, a venturi is used to mix the ozone and the organic waste composition.

Waste treatment chamber 30 further includes a mechanical pump for pumping fluid from treatment chamber 30 to settling device 40 or to some other desired location. Alternatively, fluid from treatment chamber 30 can flow to the settling device 40 by gravitation. It should be understood, however, that settling device 40 can be located prior to treatment chamber 30 in an alternative embodiment.

As shown, in this embodiment, conduit 12 carries post-ozonated animal waste composition from waste treatment chamber 30 to settling device 40. As contemplated by the present invention, settling device 40 may comprise a concrete pad or, alternatively, any suitable clarifier may be used which is configured to slow the flow rate of the post-ozonated waste composition and permit solids to settle out from the waste composition. As illustrated in FIG. 1, settling device 40 comprises a concrete pad to trap sand and other sediment from the post-ozonated animal waste composition. The post-ozonated animal waste composition is conducted from settling device 40 into another solids separator 60 via conduit 13. Conduit 13 is configured as described above for conduit 11. Solids separator 60 separates suspended solids from the animal waste composition, thereby decreasing the contamination of the remaining composition.

As encompassed by the present invention, solid separator 60 may comprise a passive filtration system, whereby filtering is accomplished through the application of gravity on the composition, or, in an alternative embodiment, solids separator 60 may further include a pump to drive the waste composition over a filter. However, it should be noted that any suitable means for separating particulate matter from a composition are contemplated by the present invention. Further, it should be understood that, in some applications, the settling device 40 and the solid separator 60 can be combined into a single filtration system, device, or apparatus. In one particular embodiment, a solids separating device may not even be needed such as indicated by the arrow 90 shown in FIG. 1.

The post-ozonated waste composition is conducted from solids separator 60 into first biobasin 70 via conduit 14. First biobasin 70 may comprise a pond, a lagoon, a holding tank or other suitable reservoir for holding fluid. First biobasin 70 can include microorganisms configured to degrade or utilize organic matter within the animal waste system.

In accordance with the present invention, the waste composition from first biobasin 70 can be decanted for use in irrigation or, alternatively, conducted via conduit 15 to second biobasin 80. Second biobasin 80 may be configured to contain additional microorganisms to degrade or utilize organic components in the waste. In yet another embodiment contemplated by the invention, the waste composition from first biobasin 70 can be recirculated to treatment chamber 30 via conduit 15. Conduit 15 is configured as described above for conduit 11, and may further comprise at least one valve, such that the flow of waste composition can be directed along the desired path.

From second biobasin 80, excess water can be decanted for various uses. Alternatively, the water can be conducted to charge pond 90 via conduit 16. The water in charge pond 90 provides a source of water for flush tank 20 and may be held for an indefinite period until needed.

In one embodiment, the post-ozonated waste composition can be supplied to growing plants 85. The post-ozonated waste facilitates plant growth by providing essential nutrients to a growth media (soil) for the plant roots to absorb. Plant material, such as seeds, rhizomes, tubers, and the like of adapted plant species are sown in or on a rooting media and water is supplied through a delivery device or by gravity flow. The waste from which nutrients are to be removed can be tested to determine approximate concentrations of essential minerals so that appropriate volumes of the waste material can be supplied to the structure.

Plant pests are managed by combinations of mechanical, chemical, and biological methods with emphasis to avoid accumulations of toxic pesticide residues. The plants are harvested at maturity or earlier when viable, such as when in a salable size. The residual growth media is removed from the structure, and treated for reuse or disposal. During the growing period of the plants, runoff and leachate can be collected and depending on concentration of salts determined by tests may be recycled through the structure by a pump delivery system or may be discharged into surface waters safely.

In the embodiment shown in FIG. 1, for instance, the ozonated organic waste is fed to a plant system 85 from the secondary lagoon 80. Alternatively, the ozonated organic waste can be fed to the plant system 85 directly from the primary lagoon 70 as shown by arrow 92. It should be understood, however, that the ozonated waste can also be fed to the plant system 85 directly after treatment chamber 30 as shown by arrow 94. For instance, the ozonated organic waste may have its maximum fertilizer potential when leaving treatment chamber 30. In addition to being fed to the plant system 85 after the treatment chamber 30, the ozonated organic waste can also be fed to the plant system after any of the other post-treatment operations described herein.

In one particular embodiment of the present invention, the ozonated organic waste is fed to the plant system 85 after leaving secondary lagoon 80. In this embodiment, the waste composition can be ozonated a second time using an ozonator 87. Ozonator 87, however, is optional and may not be needed in many applications. When included, the ozonator 87 can further ozidize any organic material contained within the composition.

The plants can be grown in a structure to minimize potential escape of animal waste to surface and ground water sources. In one embodiment the structure can be a man-made wetland. The wetland can be either lined (most commonly with some type of nontoxic plastic liner) or unlined. If there is no liner, most commonly, the natural soil serves as the rooting medium for plant growth, although various amendments may be added to the soil to foster plant growth. If there is a liner, a rooting medium can be supplied. In one example, the rooting medium can be soil. The man-made wetland can be of varying size from less than 0.001 acre to over 1,000,000 acres. The wetlands can be flooded (and drained) and water can be added as necessary utilizing open ditches and gravity flow. In one embodiment, excess water from the plant system 85 can be returned to the charge pond 90. Closed pipe systems are preferred for the transport of the waste composition to the wetland.

In another embodiment, the structure plants are grown in a hydroponics system. A hydroponics system effectively involves growing plants in a soil-less system, usually in a liquid medium that provides all essential minerals. Artificial support for plants may be provided. One example of artificial support is wood. Another example of artificial support is a wire structure. Plants can be produced with ambient light and minimal temperature control.

In yet another embodiment, the structure plants are grown in a greenhouse flat. The plants are grown in soil or an artificial medium in a container.

One method for operating the animal waste treatment system of the present invention will now be described. One embodiment of the present invention includes a barn or alternate animal confinement area. Animals confined within the barn produce animal waste, comprising excrement, spilled food, used bedding and the like. In one embodiment of the present invention, water from flush tank 20 mixes with animal waste from the barn floor, making an animal waste composition. Water from flush tank 20 flushes the animal waste composition into treatment chamber 30 via conduit 11. Alternatively, animal waste can be manually deposited into treatment chamber 30, wherein water from flush tank 20 mixes with animal waste to make an animal waste composition.

Ozone is then delivered from the ozonator into chamber 30 to contact the waste composition in an amount sufficient to oxidize at least a portion of any organic material contained in the animal waste composition. The ozone in the ozone-enriched air decomposes organic compounds present in the waste composition. As one of skill in the art will appreciate, the concentration of ozone necessary to treat animal waste is dependant upon a number of variables including: the volume of the treatment chamber; the amount of time animal waste composition is in contact with ozone; the temperature inside the chamber; the presence of ultraviolet light; the presence or absence of agitation; the number of times/day the holding facility is flushed; and the concentration of organic solids in the flushed material.

According to the present invention, the animal waste is contacted with ozone (at an ozone concentration of at least about 0.01 ppm; preferably at or near saturation) for a sufficient length of time to ozonate at least a portion of the organic compounds contained within the composition. The ozone can be in contact with the composition for at least a few seconds, preferably from about 1 second to several days, more preferably from about 1 second to 1 hour, and even more preferably from about 1 second to about 20 minutes. The ozone concentration can be at least about 0.01 ppm; preferably from about 0.1 ppm to about 1.0 ppm; and most preferably close to or at saturation.

Following ozone treatment, post-ozonated treated animal waste composition is conducted from waste treatment chamber 30 to settling device 40 via conduit 12. Settling device 40 comprises a suitable clarifier which permits the flow rate of the post-ozonated waste composition to be slowed, so that heavy solids settle out from the waste composition. For example, settling device 40 may be a concrete pad, such that passage across the pad may slow the flow rate of the post-ozonated waste composition and permit sand and other particulates to be trapped. Following passage across settling device 40, post-ozonated waste composition is conducted to solids separator 60 via conduit 13. According to one embodiment contemplated by the present invention, post-ozonated waste composition enters the top of settling device 40 through conduit 12 positioned at the top of settling device 40, and exits through conduit 13 positioned at the bottom of settling device 40, thus allowing gravity to facilitate the filtering of the post-ozone treated animal waste composition.

Conduit 13 conducts the post-ozonated waste composition from settling device 40 to solids separator 60, wherein suspended particulate matter is further removed from the animal waste composition. Post-ozone treated animal waste composition is conducted from solids separator 60 to first biobasin 70, containing microorganisms configured to biodegrade certain components in the waste composition.

In one embodiment of the present invention, waste composition from first biobasin 70 can be recirculated to treatment chamber 30 via conduit 98. Alternatively or in addition to being recirculated to treatment chamber 30, the waste composition can also be directed to second biobasin 80. Second biobasin 80 may further comprise additional microorganisms, different species or the same as in the first biobasin 70, to degrade organic components contained in the waste composition.

From second biobasin 80, the animal waste composition is decanted through discharge line 16 for further use. For example, the excess water decanted from the post-ozonated animal waste composition can be used for irrigation.

Alternatively, the excess water from the treated animal waste composition exiting from first biobasin 70 or from second biobasin 80 can be discharged into charge pond 90 by means of a conduit system or through gravitation. The water from charge pond 90 can be fed via conduit 17 into tank 20, thus providing a recirculating source of flush water for the animal waste treatment system.

In one embodiment of the present invention, the ozonated aqueous composition can be fed to a plant system 85 as shown in FIG. 1 for plant growth. For example, as described above, some waste materials such as animal waste contain relatively high concentrations of fertilizing nutrients, such as nitrogen, phosphorous and potassium. These nutrients are typically contained in the ozonated composition. In accordance with the present invention, the composition can be fed to the plants that will beneficially remove these nutrients from the composition.

In general, the composition can be fed to any suitable plant or crop. In one embodiment, the composition can be fed to a wetland for use by any vegetation that may be present in the wetland. A wetland is typically defined as a foliage and vegetation area that is configured to accept runoff.

Alternatively, the composition can be fed to plants in a hydroponic system. A hydroponic system involves growing plants in a soil-less system, usually in a liquid medium that provides all essential minerals. For example, a hydroponic system may be a highly regulated and controlled system for growing plant tissue in individual containers. Alternatively, the hydroponic system can be used to grow algae.

In another embodiment, the composition can be fed to aquatic plants contained in an aquatic environment. The aquatic plants can be, for instance, algae grown in a pond that is used to produce fish. For example, the pond can contain plants that are used to feed grass carp.

In still another embodiment, the composition can be used as irrigation water. For example, the composition can be sprayed over a field or used to irrigate plants grown in greenhouse flats or similar containers.

As shown in FIG. 1, composition discharged from second biobasin 80 can be fed to the plant system 85. It should be understood, however, that the ozonated composition can be fed to the plant system 85 from other locations. For example, the ozonated composition can be fed to the plant system 85 from the treatment chamber 30, from the settling device 40, from the solid separator 60, and/or from the first biobasin 70. It also should be understood that the composition could be further contacted with ozone in accordance with the present invention and further ozonated prior to being deposited into the plant system after any of the above locations.

In one particular embodiment of the present invention, waste materials are collected in treatment chamber 30 and ozonated in accordance with the present invention. The ozonated composition is then fed directly into the plant system for plant growth.

Figure 2:
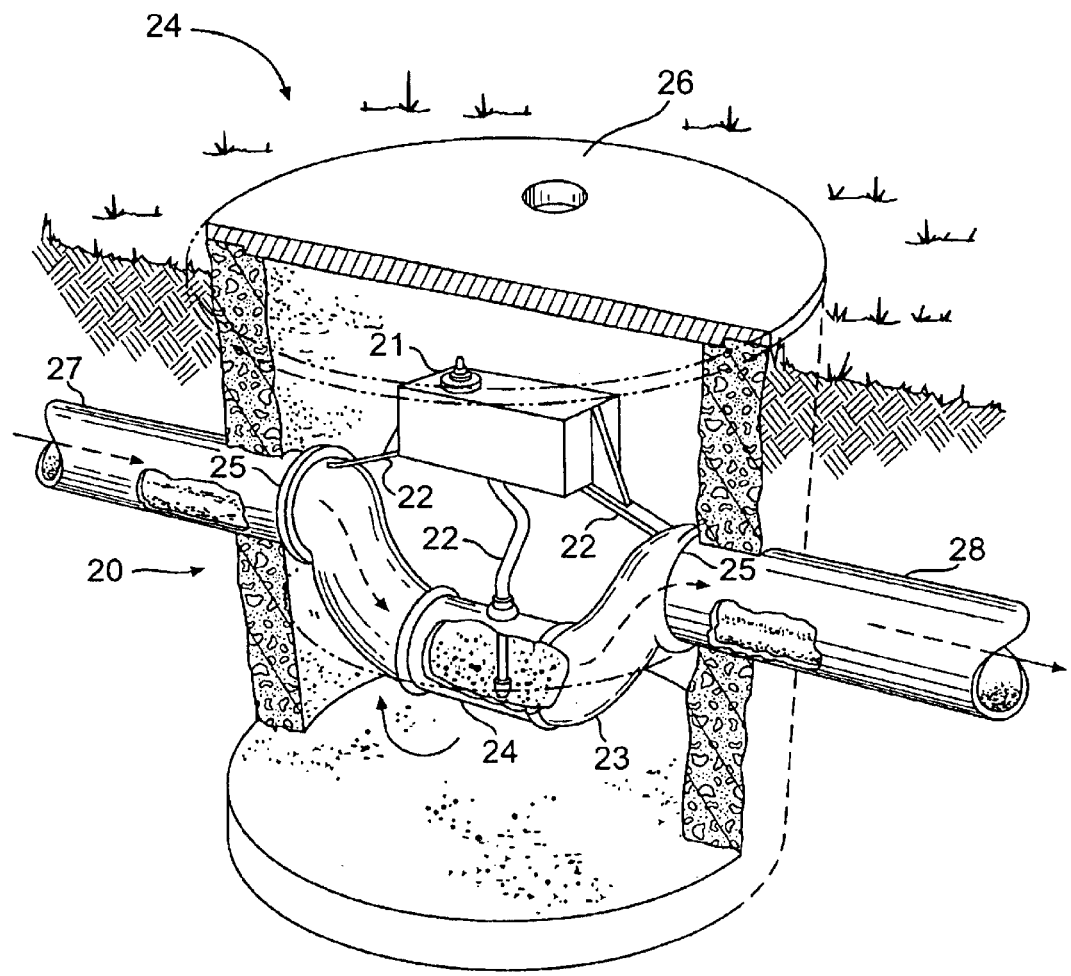
FIG. 2 is a diagrammatical view illustrating an in-line ozonation device made in accordance with the present invention.

Referring now to FIG. 2, an in-line ozonator useful in the present invention is illustrated. In general, the in-line ozonator can be used to replace treatment chamber 30 in the present invention when small volumes of low particle wastewater are to be treated. Also contemplated by the present invention is placing an in-line ozonator anywhere in the system illustrated in FIG. 1 between any of the components. However, it should be appreciated that many other various uses for an in-line ozonator exist. For example, in accordance with the present invention, an in-line ozonator can be placed in a golf course and used to treat irrigation water.

It should be understood that the in-line ozonator can be used to treat any malodorous wastewater or low particulate wastewater in accordance with the present invention.

In-line ozonator system 24 broadly comprises ozonator 21, connected to u-shaped tube 23 by at least one connector 22; u-shaped tube 23, connected via a first swivel joint 25 to inlet 27 and connected via a second swivel joint 25 to outlet 28; tank 20 and cover 26. As shown, u-shaped tube 23 includes a bottom section 29 which is at an elevation lower than inlet 27 and outlet 28. Inlet 27 and outlet 28, in this embodiment, are axially opposed.

Ozonator 21 preferably comprises an ozone generator to generates ozone from air and/or oxygen and produce ozone-enriched air. Ozonator 21 further includes a source of electricity to produce ozone. Preferably the electricity source comprises a photovoltaic array, however, one of ordinary skill in the art will recognize that other mechanisms for generating electricity may be suitable for use in the present invention. Ozonator 21 is connected to u-shaped tube 23 by at least one connector 22.

As embodied by the present invention, connector 22 may comprise a tube, pipe, channel or other device suitable to allow ozone to enter u-shaped tube 23, permitting ozone to contact the waste composition in an amount sufficient to oxidize at least a portion of any organic material contained in the animal waste composition. In a preferred embodiment, ozonator 21 permanently connects u-shaped tube 23 by connector 22, however, a non-permanent connection between ozonator 21 and u-tube 23 via connector 22 is contemplated by the present invention.

U-shaped tube 23 preferably comprises first and second swivel joint 25. First swivel joint 25 connects u-shaped tube 23 to inlet 27, permitting entry of the animal waste composition into u-shaped tube 23 to contact ozone. Second swivel joint 25 connects u-shaped tube 23 to outlet 28, permitting the egress of post-ozonated waste composition.

During waste treatment operation, u-shaped tube 23 is positioned in a first position as shown in FIG. 2, having bottom 29 at the lowest point of u-shaped tube 23. To facilitate flushing and removing of sediment, u-shaped tube 23 can be swiveled into a second position, via first and second swivel joint 25, such that bottom 29 is positioned at highest point of u-shaped tube 23.

The use of the u-shaped tube 23 offers various benefits and advantages. In particular, the use of a u-shaped tube ensures that the nozzle of the ozonator remains completely immersed in the composition flowing through the tube, even under low flow conditions. For example, in low flow conditions, the fluid being treated will accumulate in the u-shaped tube even though the inlet 27 and the outlet 28 may only be partially be filled with fluid.

As contemplated by the present invention, tank 20 comprises a tank, drum, chamber, or other container suitable for holding u-shaped tube 23 and ozonator 21 and having a sufficient diameter to permit u-shaped tube 23 to swivel for operation. Tank 20 further comprises cover 26 permitting access to ozonator system 24.

Figure 6:
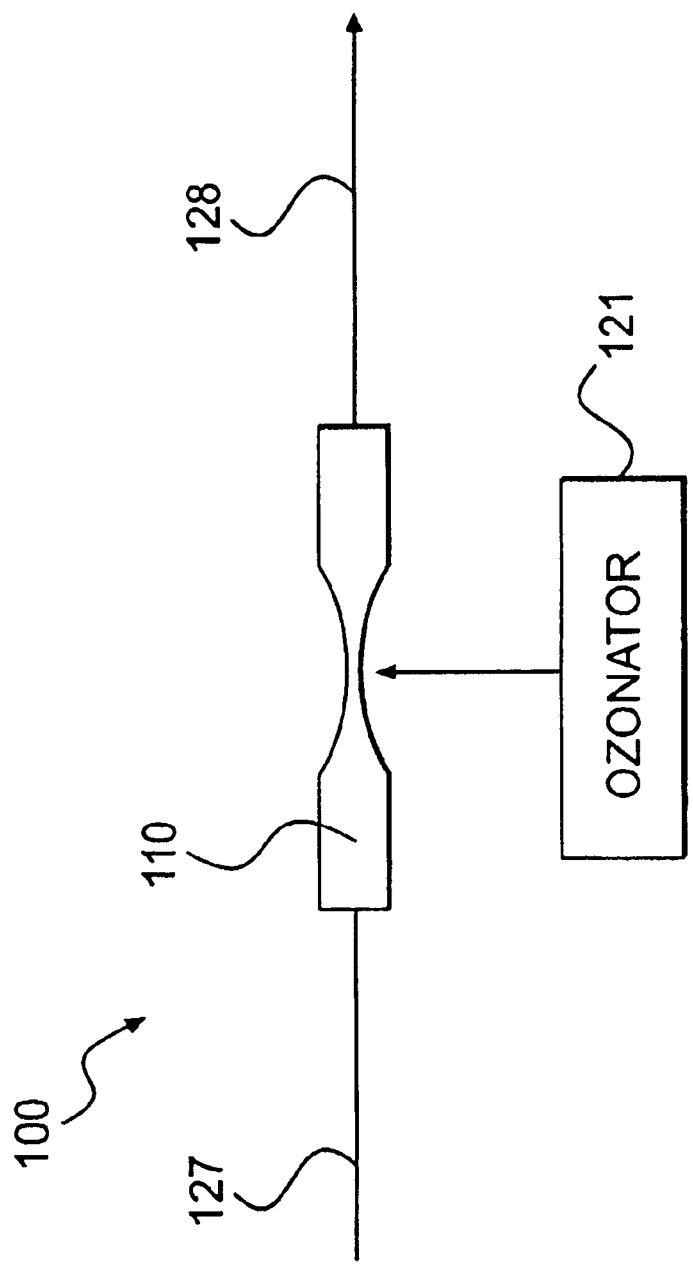
FIG. 6 is an alternative embodiment of in-line ozonation device made in accordance with the present invention.

Referring to FIG. 6, an alternative embodiment of an in-line ozonator generally 100 is shown. In this embodiment, in order to contact a solution containing organic compounds with ozone, the system includes an inlet 127 separated from an outlet 128 by a venturi 110. Venturi 110 is in communication with ozonator 121. A venturi is a constriction that is placed in a pipe or tube that causes a drop in pressure as fluid flows through it. As shown in the figure, the venturi can include a straight section or a throat positioned in between two tapered sections. When used in the process of the present invention, the venturi draws the ozone into the main flow stream.

Using a venturi in the system of the present invention offers various advantages. For instance, the venturi allows the ozone to rapidly combine with the composition containing the organic compounds to be treated. Thus, a maximum amount of ozone can be dissolved into the composition. Further, better mixing between the ozone and the organic compounds is achieved using the venturi.

Venturi 110 can be used in the system illustrated in FIG. 1 in order to feed ozonated water to the treatment chamber 30. For example, in one embodiment, the venturi 110 can be placed within a circulation conduit that is placed in communication with treatment chamber 30. The composition accumulated in the treatment chamber 30 can then be pumped using a pump through the circulation conduit and into the venturi for contact with ozone. The composition contained within the treatment chamber can be repeatedly circulated through the circulation conduit until the composition is ozonated to the extent desired.

Alternatively, the in-line ozonator can also be used for treating any aqueous composition.

The present invention may be better understood with reference to the following examples.

EXAMPLE 1

Ozone Treatment of Animal Waste

For each experimental replication, samples of wastewater (about 1 pint each) were collected from the LaMaster Dairy Farm barn flush system(Clemson University, Clemson, S.C.). To ensure a representative sample of barn flushwater was treated, samples were collected from the beginning, middle, and end of a barn flush cycle such that the total volume collected was approximately 1.0 gallon. Samples collected from each timepoint were commingled and immediately transported to the laboratory.

In the laboratory, samples were thoroughly mixed before treating individual samples (final volume of each sample ranged from about 50 mls to about 2.0 L) according to the present invention.

Ozone, generated by a PUREPOWER ozonator (Longmark Ozone Industries, Yreka, Calif.), was bubbled through the wastewater samples for 20 minutes at a concentration of from about 0.3 ppm ozone to about 0.4 ppm ozone. Samples of the wastewater, collected in test tubes before and after ozone treatment, were analyzed for biochemical oxygen demand (BOD), chemical oxygen demand (COD), total bacteria count, coliform bacteria count, and for malodorous aromatic compounds by reverse phase chromatography.

EXAMPLE 2

BOD Levels in Post-Treated Wastewater

Biochemical Oxygen demand (BOD) was measured by the 5-day BOD test method. Experimental protocols for measuring BOD can be readily obtained from standard reference texts such as Section 5210 B of *Standard Methods for the Examination of Water and Wastewater*, 19th edition, 1995; Eaton, A. D., L. S. Clesceri, and A. E. Greenberg, eds. (American Public Health Association, Washington, D.C.; the contents of which is incorporated in its entirety) without undue experimentation.

Figure 3A:
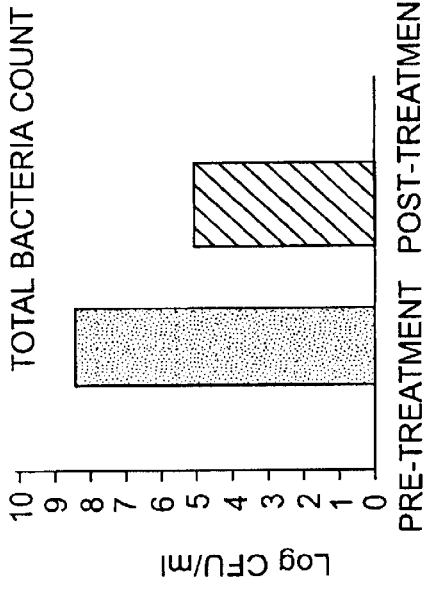
FIG. 3(a) is a graph illustrating the results of biochemical oxygen demand (BOD) and pretreatment waste solution as compared to post treatment waste solution.

FIG. 3A is a graphic illustration comparing the BOD in the wastewater effluent before ozone-treatment to that following treatment according to the present invention. FIG. 3A indicates a significant reduction in BOD occurred as a result of treatment, from approximately 5000 mg/L to approximately 1000 mg/L.

EXAMPLE 3

Total Bacteria Count in Post-Treated Wastewater

Total aerobic bacteria counts may be determined by using standard experimental methods, such as the aerobic plate count method outlined in chapter 3 of the *FDA Bacteriological Analytical Manual*, 8th edition, 1995 (AOAC International, Gaithersburg, Md.; the contents of which is incorporated in its entirety) without undue experimentation.

Figure 3C:
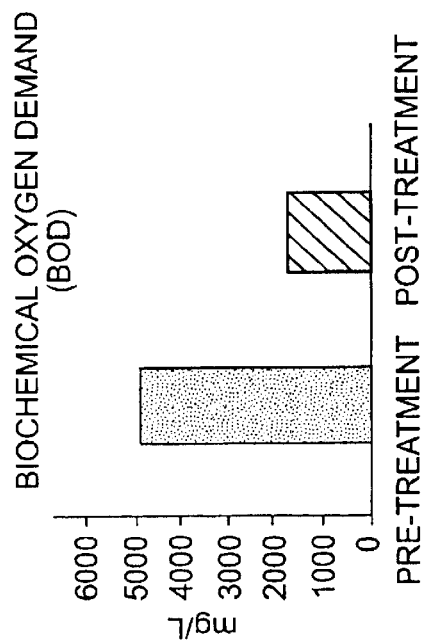
FIG. 3(c) is a graph illustrating the coliform bacteria count in pretreatment waste as compared to waste treated in accordance with the present invention.
Figure 3B:
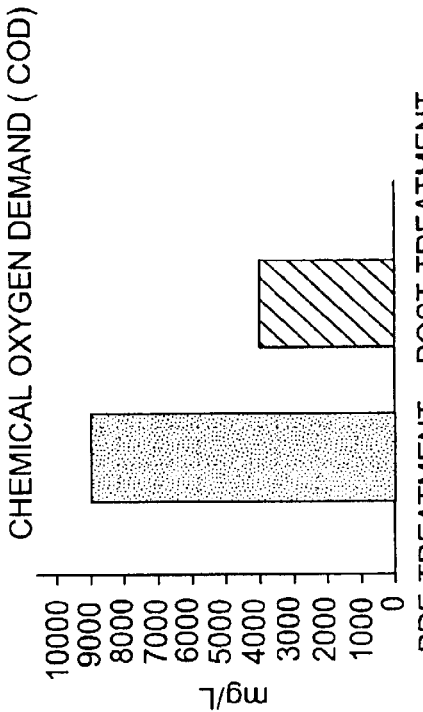
FIG. 3(b) is a graph illustrating the total aerobic bacterial count of the pretreatment waste solution compared to waste solution treated in accordance with the present invention.

FIG. 3B is a graphic illustration comparing the total aerobic bacteria count in the wastewater effluent before ozone-treatment to that following treatment according to the present invention. FIG. 3B shows a significant reduction in total aerobic bacteria count occurred as a result of treatment, from approximately 8 log CFU/ml to approximately 5 log CFU/ml.

EXAMPLE 4

Coliform Bacteria Count in Post-Treated Wastewater

Coliform bacteria were enumerated in the before and after samples by using the violet red bile agar (VRBA) solid media method as outlined in chapter 4, section E, of the *FDA Bacteriological Analytical Manual*, 8th edition, 1995 (AOAC International, Gaithersburg, Md.; the contents of which is incorporated in its entirety) without undue experimentation.

FIG. 3C graphically illustrates the number of coliform bacteria present in wastewater before treatment as compared to the coliform bacteria present in samples treated according to the present invention. As illustrated in FIG. 3C, a significant reduction in coliform counts of about 4 logs occurred following treatment, from approximately 7 log CFU/ml to approximately 3 log CFU/ml.

EXAMPLE 5

COD Levels in Post-Treated Wastewater

Chemical oxygen demand (COD) was measured by the Closed Reflux, Colimetric Method. Experimental protocols for measuring COD can be readily obtained from consulting standard reference texts such as Section 5220 D of *Standard Methods for the Examination of Water and Wastewater*, 19th edition, 1995; Eaton, A. D., L. S. Clesceri, and A. E. Greenberg, eds. (American Public Health Association, Washington, D.C.; the contents of which is incorporated in its entirety) without undue experimentation.

Figure 3D:
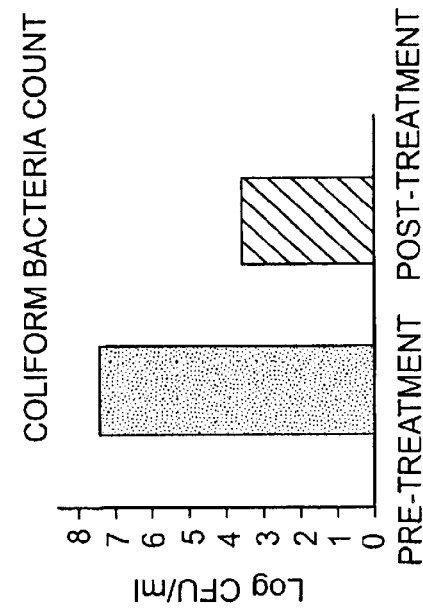
FIG. 3(d) is a graphic illustration of the chemical oxygen demand (COD) in pretreated waste versus waste treated in accordance with the present invention.

FIG. 3D is a graphic illustration comparing the COD in the wastewater effluent before ozone-treatment to that following treatment according to the present invention. FIG. 3D indicated a significant reduction in COD occurred as a result of treatment, from approximately 9000 mg/L to approximately 4000 mg/L.

EXAMPLE 6

Levels of Malodorous Aromatic Compounds in Post-Treated Wastewater

Malodorous aromatic compounds (indole, skatole, cresol, and the like) were analyzed by high-pressure liquid chromatography (HPLC) using a water/acetonitrile gradient and a C5 reverse phase column (Phenomenex, Torrence, Calif.). Detection was at 280 nm using the Rainin gradient DYNAMAX system with Macintosh computer control and METHOD MANAGER SOFTWARE (Rainin Instrument Co., Woburn, Mass.).

Figure 4:
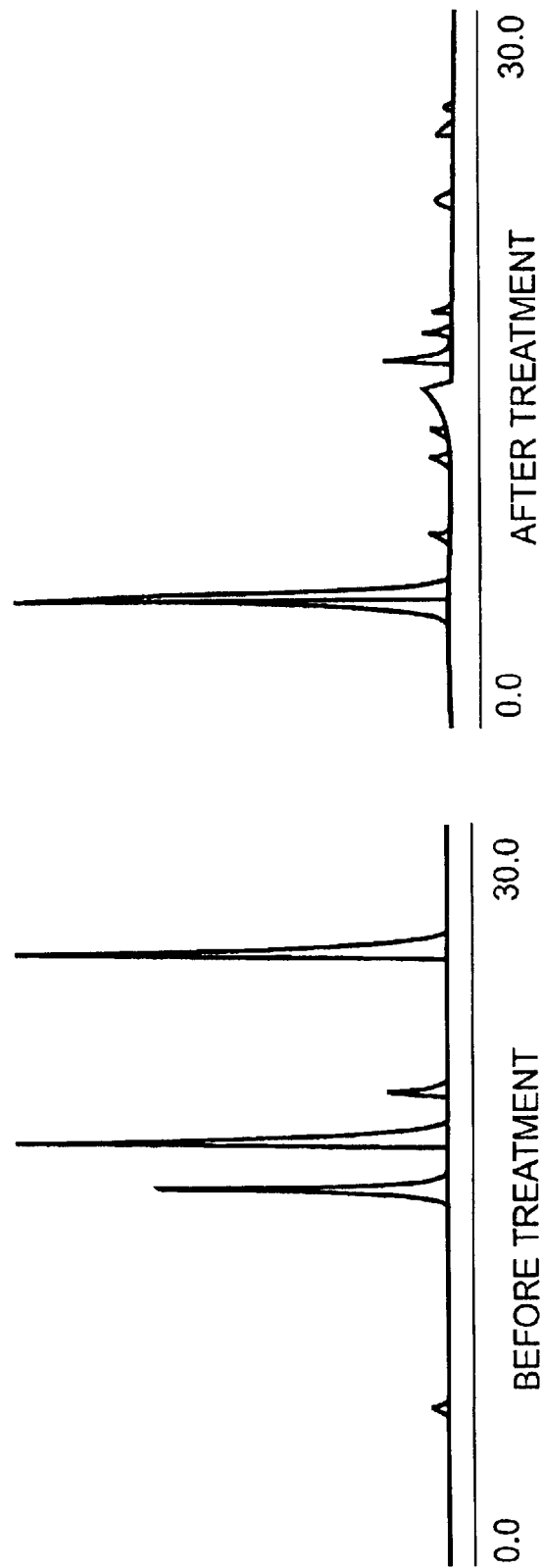
FIG. 4 illustrates reverse phase HPLC analysis of odoriferous manure components in a solution before treatment, as compared to a solution after treatment in accordance with the present invention.

FIG. 4 is a graph illustrating the results of reverse phase high-pressure liquid chromatography (HPLC) analysis of the components responsible for the odor associated with animal waste. As illustrated by the HPLC graph, levels of the odoriferous components are significantly reduced following treatment according to the present invention.

Figure 5:
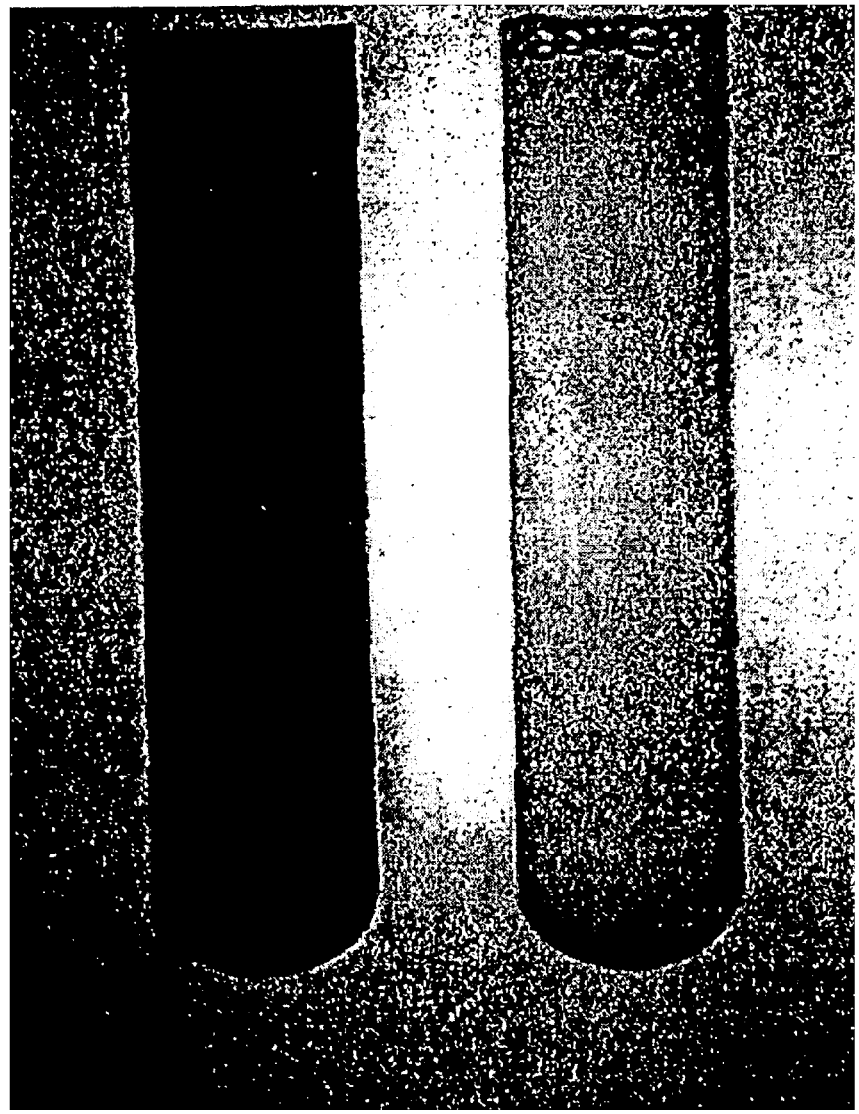
FIG. 5 is a photograph illustrating the appearance of pretreatment waste solution as compared to waste treated in accordance with the present invention.

FIG. 5 is a photograph of the appearance of wastewater effluent before treatment (5A) as compared to the appearance of effluent treated according to the present invention (5B). FIG. 5 indicates that the treated waste solution is clear and colorless as compared to the untreated effluent.

Although preferred embodiments of the invention have been described using specific terms, devices, concentrations, and methods, such description is for illustrative purposes only. The words used are words of description rather than of limitation. It is to be understood that changes and variations may be made without departing from the spirit or the scope of the following claims.

What is claimed is:

1. A process for treating an organic composition comprising the steps of:
    collecting an organic composition;
    contacting said organic composition with a gas comprising ozone, said ozone being present in an amount sufficient to oxidize organic matter contained in said composition;
    thereafter feeding said organic composition to a plant system, said plant system comprising a system selected from the group consisting of a man-made wetland, a tree farm, a hydroponics plant system, a greenhouse plant system, an aquatic plant system, and a crop field.

2. A process as defined in claim 1, wherein said ozone is contacted with said organic composition at a concentration of at least 0.01 ppm.

3. A process as defined in claim 1, wherein said ozone is contacted with said organic composition at a concentration of at least about 0.3 ppm.

4. A process as defined in claim 1, wherein said ozone is contacted with said organic composition for from about 1 second to about 5 minutes.

5. A process as defined in claim 1, wherein said ozone is contacted with said organic composition at a concentration of at least about 100 ppm.

6. A process as defined in claim 1, wherein said ozone is contacted with said organic composition for about 1 second to about 20 minutes.

7. A process as defined in claim 1 wherein the plants in said plant system are perennial plants.

8. A process as defined in claim 1 wherein said plant system is a man-made wetland.

9. A process as defined in claim 1 wherein said plant system is an ornamental tree farm.

10. A process as defined in claim 1 wherein said plant system is a tree farm for producing timber.

11. A process as defined in claim 1 wherein said plant system is a hydroponics system.

12. A process as defined in claim 1 wherein said plant system is a greenhouse plant system.

13. A process as defined in claim 1 wherein said organic composition is transported to said plant system by a closed pipe system.

14. A process as defined in claim 1, wherein the organic composition comprises animal waste.

15. A process as defined in claim 1, wherein the organic composition is provided by combining water with an organic waste material.

16. A process for treating an organic composition comprising the steps of:
    collecting an organic composition;
    contacting said organic composition with a gas comprising ozone, said ozone being present in an amount sufficient to oxidize organic matter contained in said composition;
    feeding said ozone treated organic composition to a solids separating device for removing solids from said composition; and thereafter feeding said ozonated composition to a biobasin, said biobasin containing microorganisms configured to bioutilize certain components contained in said organic composition.

thereafter feeding said organic composition to a plant system.

17. A process as defined in claim 15, wherein said ozone is contacted with said organic composition at a concentration of at least 0.01 ppm.

18. A process as defined in claim 16, wherein wherein the plant system comprises plants located in a defined field.

19. A process as defined in claim 16, wherein said ozone is contacted with said organic composition at a concentration of at least 100 ppm.

20. A process as defined in claim 16, wherein the plants in said plant system are perennial plants.

21. A process as defined in claim 16, wherein said plant system is a man-made wetland.

22. A process as defined in claim 16, wherein said plant system is an ornamental tree farm.

23. A process as defined in claim 16, wherein said plant system is a timber field.

24. A process as defined in claim 16, wherein said plant system is a hydroponics system.

25. A process as defined in claim 16, wherein said plant system is a greenhouse flat.

26. A process as defined in claim 16, wherein the plant system comprises aquatic plants.

27. A process as defined in claim 16, wherein the plant system comprises woody ornamentals.

28. A process as defined in claim 16, wherein the plant system comprises annual plants.

29. A process for treating an organic composition comprising:

providing an aqueous organic composition to a treatment chamber;

contacting said aqueous organic composition with a gas comprising ozone in said treatment chamber, said ozone being present in an amount sufficient to oxidize at least a portion of any organic matter contained in said composition, feeding said aqueous organic composition to a solids separating device for removing solids from said composition; and feeding said oxidized aqueous organic composition to a biobasin, said biobasin containing microorganisms configured to biodegrade certain components contained in said composition.

30. A process as defined in claim 29, wherein said treatment chamber includes a top and a bottom, and wherein said gas comprising ozone is fed to said treatment chamber at a location adjacent to the bottom of said chamber, where gas bubbling up through said chamber from said bottom to said top.

31. A process as defined in claim 29, wherein said ozone is contacted with said organic composition in an amount sufficient to reduce the COD by at least 5%.

32. A process as defined in claim 29, wherein said ozone is contacted with said organic composition in an amount sufficient to reduce the BOD of said composition by at least 5%.

33. A process as defined in claim 29, wherein said ozone is contacted with said organic composition in an amount sufficient to reduce the total bacterial count of said composition by at least 5%.

34. A process as defined in claim 29, wherein said ozone is contacted with said organic composition in an amount sufficient to reduce the coliform bacterial count of said composition by at least 5%.

35. The process as defined in claim 29, further comprising the step of feeding said ozone treated organic composition to a first solids separating device and to a second solids separating device, said first solids separating device being configured to remove sediment from said organic composition, said second solid separating device being configured to remove suspended particulate matter from said organic composition.

36. A process as defined in claim 29, wherein said ozone is contacted with said organic composition at a concentration of at least 0.01 ppm.

37. A process as defined in claim 29, wherein said ozone is contacted with the organic composition at a concentration from about 0.3 ppm to about 0.5 ppm, said contact occurring for about 5 minutes to about 20 minutes.

38. A process as defined in claim 29, wherein said microorganisms contained in said biobasin biodegrade said components contained within said organic composition anaerobically.

39. A process as defined in claim 29, wherein said microorganisms contained in said biobasin biodegrade said components contained within said organic composition aerobically.

40. A process as defined in claim 29, further comprising the step of feeding said organic composition from said biobasin to a second biobasin, said second biobasin also containing microorganisms configured to biodegrade certain components contained within said organic composition.

41. A process for treating an organic composition comprising:

providing an aqueous organic composition to a treatment chamber;

contacting said aqueous organic composition with a gas comprising ozone in said treatment chamber, said ozone being present in an amount sufficient to oxidize at least a portion of any organic matter contained in said composition, and thereafter feeding said oxidized aqueous organic composition to a biobasin, said biobasin containing microorganisms configured to biodegrade certain components contained in said composition, wherein said microorganisms contained in the biobasin biodegrade said components contained within said organic composition anaerobically.

42. A process for treating an organic composition comprising:

providing an aqueous organic composition to a treatment chamber;

contacting said aqueous organic composition with a gas comprising ozone in said treatment chamber, said ozone being present in an amount sufficient to oxidize at least a portion of any organic matter contained in said composition, thereafter feeding said oxidized aqueous organic composition to a biobasin, said biobasin containing microorganisms configured to biodegrade certain components contained in said composition, and feeding said organic composition from said biobasin to a second biobasin, the second biobasin also containing microorganisms configured to biodegrade certain components contained within the organic composition.

* * * * *